US012036164B2

(12) United States Patent
Chung

(10) Patent No.: US 12,036,164 B2
(45) Date of Patent: Jul. 16, 2024

(54) ELECTRIC BED WITH LUMBAR SUPPORT ASSEMBLY

(71) Applicant: ULIFE HEALTHCARE INC., Taoyuan (TW)

(72) Inventor: Ya-Hsin Chung, Taichung (TW)

(73) Assignee: ULIFE HEALTHCARE INC., Taoyuan (TW)

( * ) Notice: Subject to any disclaimer, the term of this patent is extended or adjusted under 35 U.S.C. 154(b) by 308 days.

(21) Appl. No.: 17/714,094

(22) Filed: Apr. 5, 2022

(65) Prior Publication Data

US 2023/0172780 A1 Jun. 8, 2023

(30) Foreign Application Priority Data

Dec. 2, 2021 (TW) ................................ 110214389

(51) Int. Cl.

*A61G 7/07* (2006.01)
*A61G 7/018* (2006.01)
*A61G 7/075* (2006.01)

(52) U.S. Cl.

CPC ............... *A61G 7/07* (2013.01); *A61G 7/018* (2013.01); *A61G 7/072* (2013.01); *A61G 7/0755* (2013.01)

(58) Field of Classification Search

CPC ...... A61G 7/018; A61G 7/072; A61G 7/0755; A47C 20/027

See application file for complete search history.

(56) References Cited

U.S. PATENT DOCUMENTS

| | | | | |
|---|---|---|---|---|
| 912,588 A * | 2/1909 | Marceilles | A61H 1/0222 606/242 |
| 6,874,182 B2 * | 4/2005 | L'Hegarat | A61G 13/12 5/624 |
| 2009/0178201 A1 * | 7/2009 | Lujan | A61G 7/07 5/630 |
| 2018/0310718 A1 * | 11/2018 | Langsweirt | A47C 23/063 |
| 2018/0338625 A1 * | 11/2018 | Nava | A47C 19/021 |

FOREIGN PATENT DOCUMENTS

TW 525120 U * 7/2016

* cited by examiner

*Primary Examiner* — Adam C Ortiz

(74) *Attorney, Agent, or Firm* — Schwegman Lundberg & Woessner, P.A.

(57) ABSTRACT

An electric bed includes a bed board assembly movably disposed on a bed frame and having a through hole, a lumbar support member movably disposed on the bed board assembly and corresponding in position to the through hole, and a plurality of linkage units each including a drive rod assembly. The drive rod assemblies of the linking units are pivotally connected to a horizontal rod of a lumbar support drive assembly. The lumbar support drive assembly is electrically actuated to drive the horizontal rod to move the drive rod assemblies between first and second positions, in which the lumbar support member is moved toward and away from the through hole, respectively.

11 Claims, 11 Drawing Sheets

ELECTRIC BED WITH LUMBAR SUPPORT ASSEMBLY

CROSS-REFERENCE TO RELATED APPLICATION

This application claims priority to Taiwanese Utility Model Application No. 110214389, filed on Dec. 2, 2021.

FIELD

The disclosure relates to an electric bed, and more particularly to an electric bed with a lumbar support assembly.

BACKGROUND

Referring to FIGS. 1 and 2, an electric bed having a lumbar support function, as disclosed in Taiwanese Utility Model No. M525120, includes a bed frame 10 extending in a longitudinal direction (L), a base frame 11 fixed to the center of the bed frame 10, a backrest frame 12 pivotally connected to the base frame 11, a lumbar support assembly 13 movably disposed on the backrest frame 12, and a mattress (not shown) covering the base frame 11, the backrest frame 12 and the lumbar support assembly 13 for a user to lie thereon. When the backrest frame 12 is driven by an electric actuator 14 to move to an inclined position (see FIG. 2) with respect to the base frame 11, the backrest frame 12 will drive the lumbar support assembly 13 to rotate and extend out therefrom. Through this, the lumbar of the user can be supported when he is moved from a lying position to a sitting position.

SUMMARY

Therefore, an object of the present disclosure is to provide an improved electric bed with a lumbar support assembly.

According to the present disclosure, an electric bed includes a bed frame, a bed board unit, and a lumbar support assembly.

The bed board unit is disposed on the bed frame and includes a first bed board assembly, a first drive member, and a second bed board assembly. The first bed board assembly is movably disposed on one side of the bed frame, and has a through hole that is elongated along a width direction of the bed frame. The first drive member is disposed on the bed frame, and is electrically actuated to drive the first bed board assembly to move between a flat horizontal state and a reclined state with respect to the bed frame. The second bed board assembly is disposed on the other side of the bed frame and is opposite to the first bed board assembly in a length direction of the bed frame.

The lumbar support assembly is movably disposed on the first bed board assembly, and includes a lumbar support member, a plurality of linkage units, and a lumbar support drive assembly. The lumbar support member extends along the width direction, and corresponds in position to the through hole. The linkage units are disposed on the first bed board assembly for driving movement of the lumbar support member. Each of the linkage units includes a fixing plate assembly fixed to the first bed board assembly, a drive rod assembly pivotally connected to one side of the fixing plate assembly, a driven rod assembly pivotally connected to the other side of the fixing plate assembly and opposite to the drive rod assembly, and a float rod assembly pivotally connected to the drive rod assembly and the driven rod assembly and fixedly connected to the lumbar support member. The lumbar support drive assembly includes a horizontal rod. The drive rod assemblies of the linkage units are pivotally connected to the horizontal rod. The lumbar support drive assembly is electrically actuated to drive the horizontal rod to move the drive rod assemblies of the linkage units with respect to the first bed board assembly between a first position, in which the lumbar support member is moved toward the through hole, and a second position, in which the lumbar support member is moved away from the through hole.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
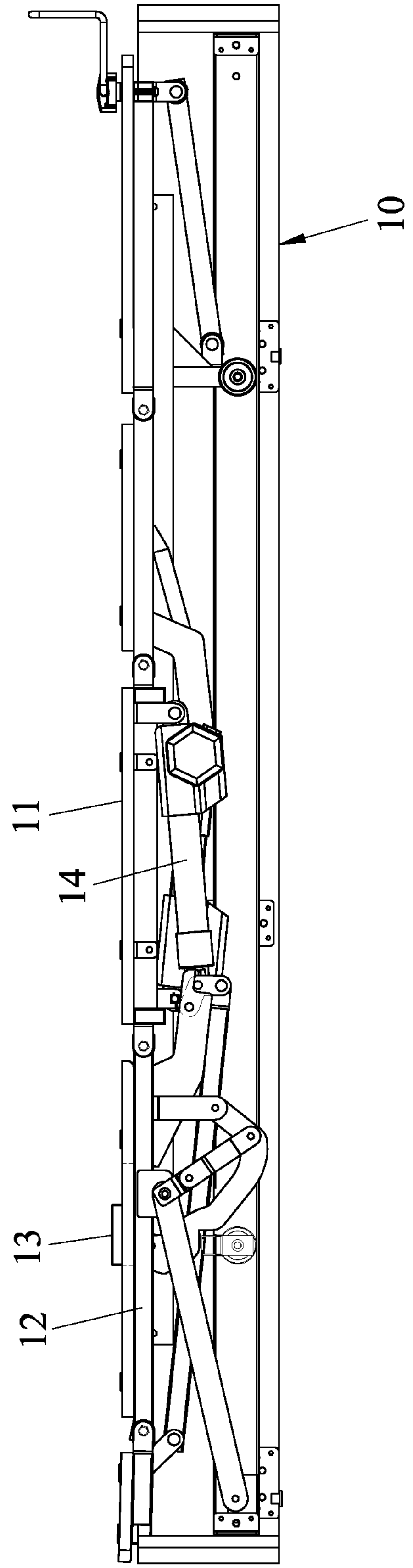
FIG.1 PRIOR ART
FIG. 1 is a front view of an electric bed disclosed in Taiwanese Utility Model Patent No. M525120.
Figure 2:
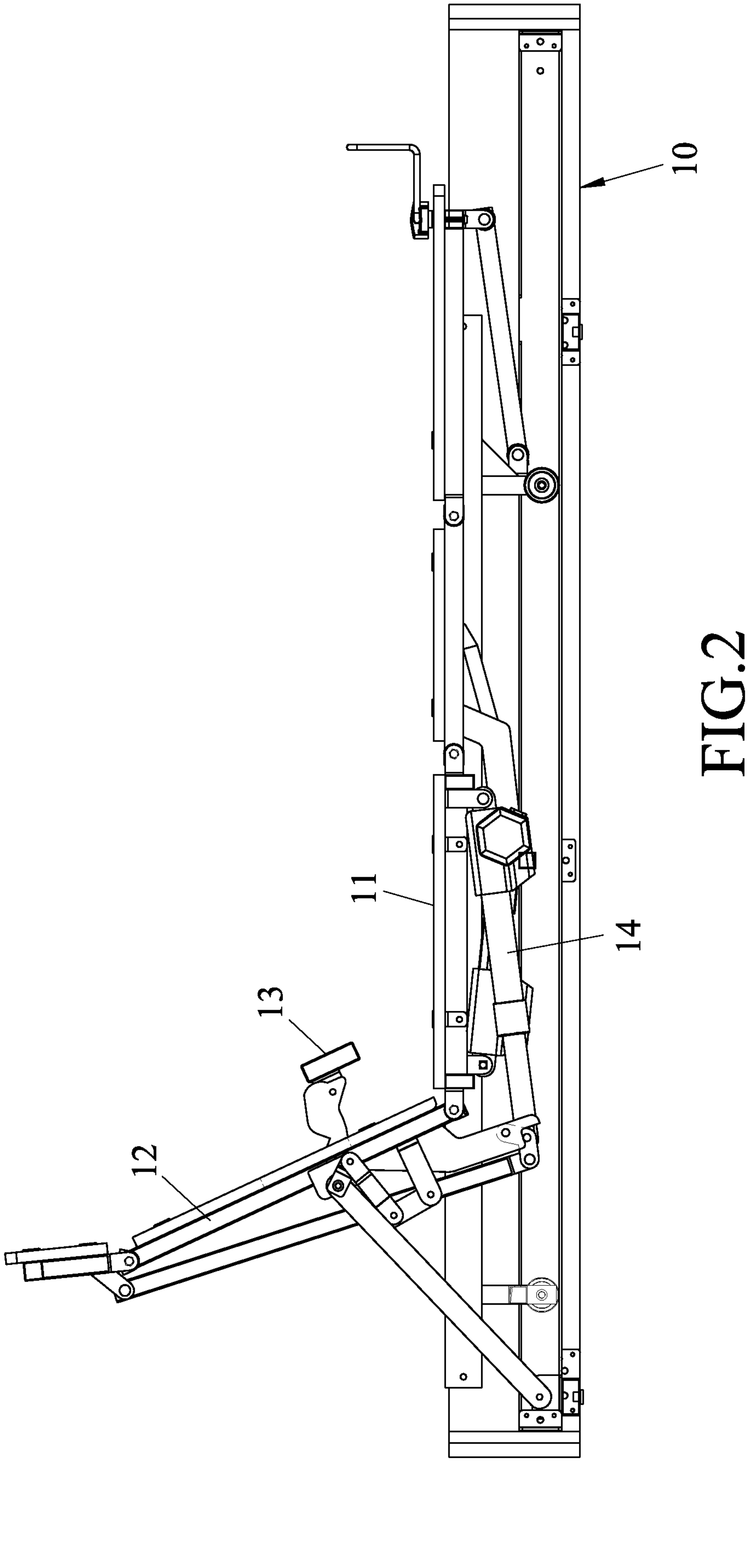
FIG.2 PRIOR ART
FIG. 2 is a view similar to FIG. 1, but illustrating a backrest frame in an inclined position.
Figure 3:
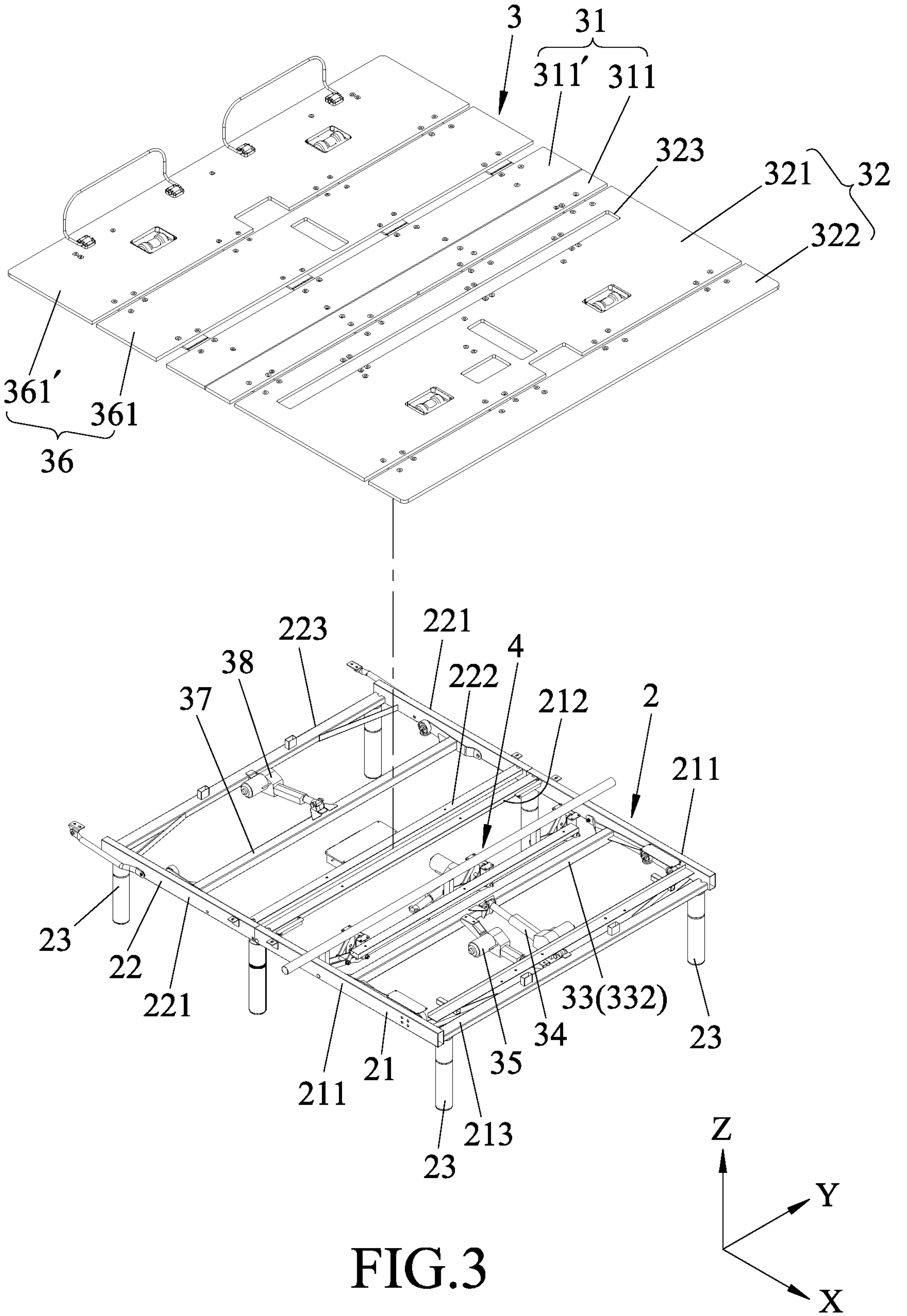
FIG. 3 is an exploded perspective view of an electric bed according to an embodiment of the present disclosure.
Figure 4:
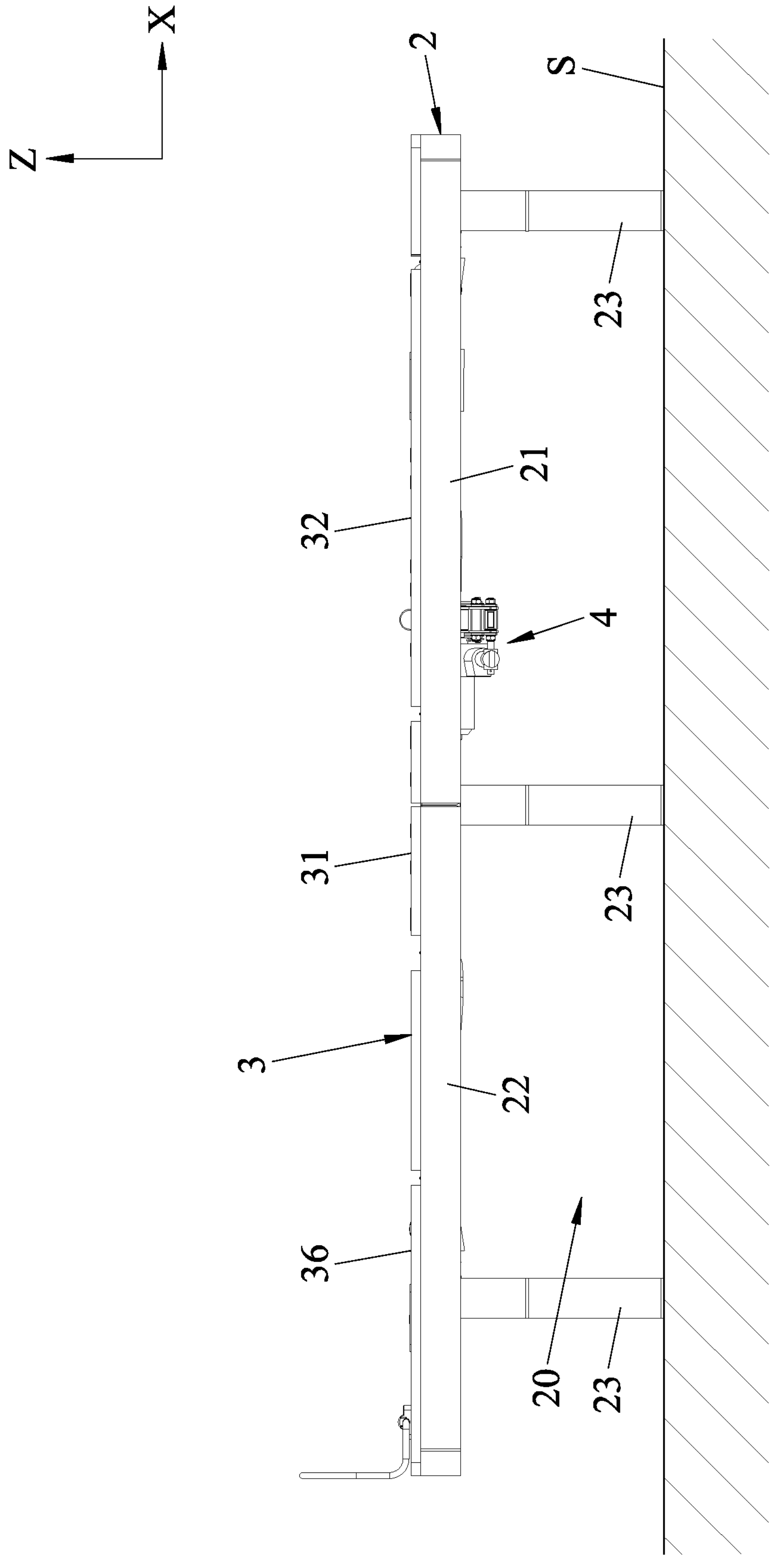
FIG. 4 is an assembled front view of the embodiment, illustrating a first bed board assembly in a flat horizontal state.
Figure 5:
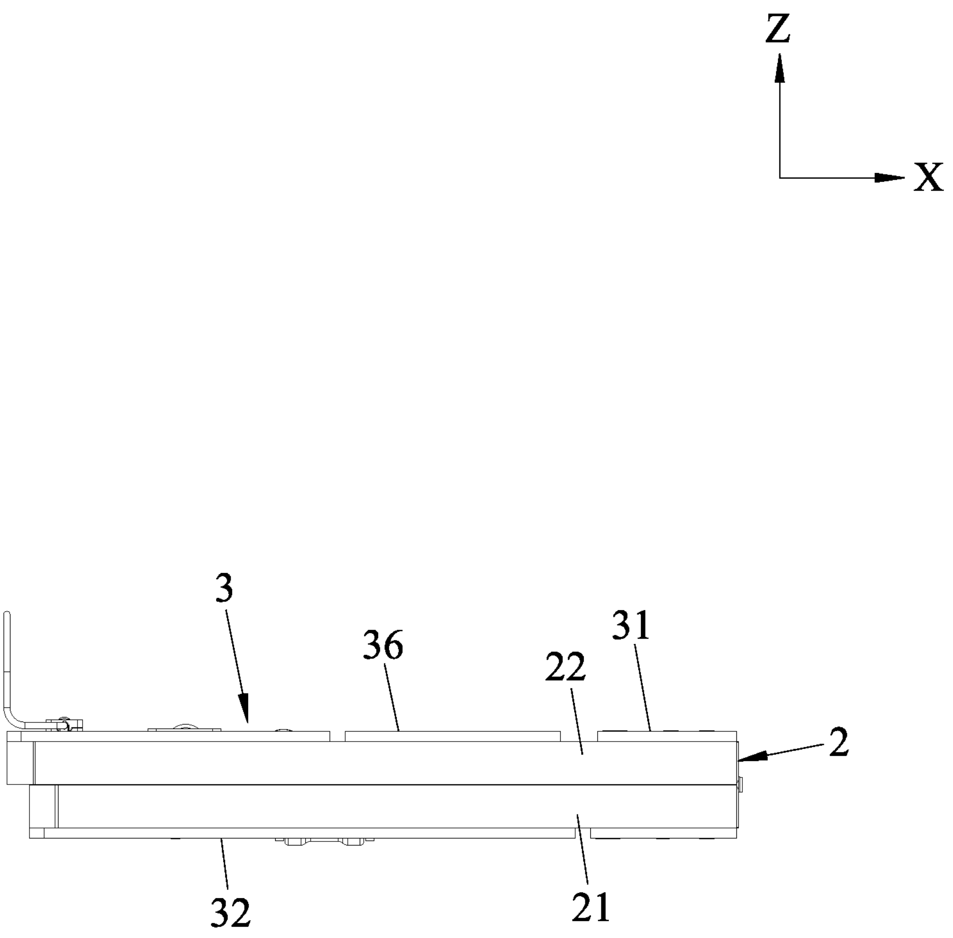
FIG. 5 is a front view of the embodiment, illustrating how the electric bed is folded in half.

Referring to FIGS. 3 to 5, an electric bed according to an embodiment of the present disclosure includes a bed frame 2, a bed board unit 3, and a lumbar support assembly 4.

The bed frame 2 is rectangular in shape, and includes a front bed frame 21, a rear bed frame 22 opposite to the front bed frame 21 in a length direction (X) of the bed frame 2, and a plurality of spaced-apart support legs 23 removably connected to the bottom sides of the front and rear bed frames 21, 22. With the support legs 23 standing on a mounting surface (S), such as a ground surface, the front and rear bed frames 21, 22 can be elevated from the mounting or ground surface (S), and a receiving space 20 can be formed between the bed frame 2 and the ground surface (S). In other embodiments, the support legs 23 may be omitted, and the front and rear bed frames 21, 22 may be configured as panels cooperatively forming a box-shaped frame that defines the receiving space 20.

As shown in FIG. 5, in this embodiment, the front and rear bed frames 21, 22 are hingedly connected to each other so as to be foldable relative to each other for convenient storage and transport of the bed frame 2. However, in other variations of this embodiment, the front and rear bed frames 21, 22 may not be foldable relative to each other. In this embodiment, each of the front and rear bed frames 21, 22 includes two side rods 211, 221, an inner end rod 212, 222 connected between inner ends of the side rods 211, 221, and an outer end rod 213, 223 connected between outer ends of the sides rods 211, 221. The inner end rods 212, 222 of the front and rear bed frames 21, 22 are proximate to each other.

Figure 6:
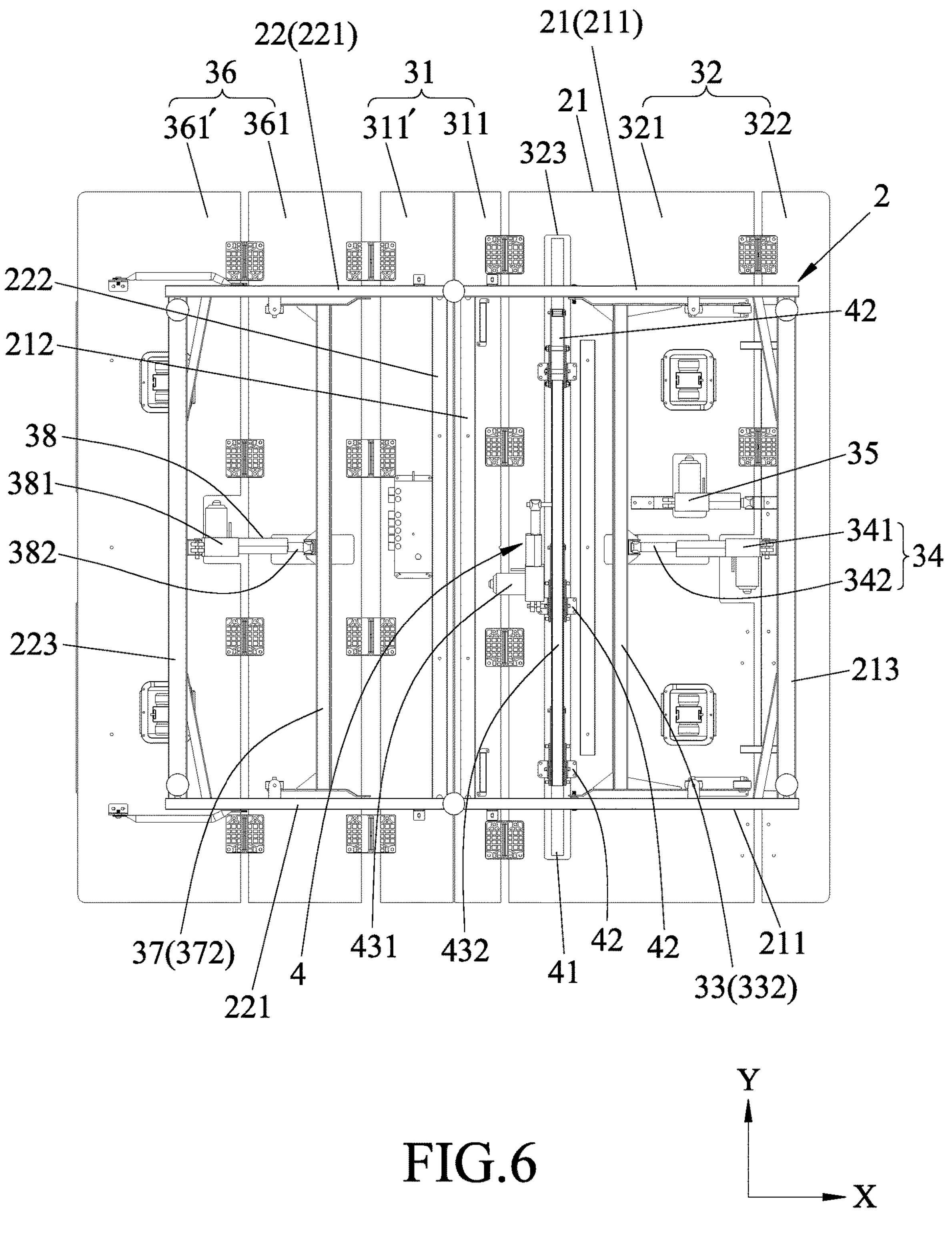
FIG. 6 is a bottom view of the embodiment.
Figure 7:
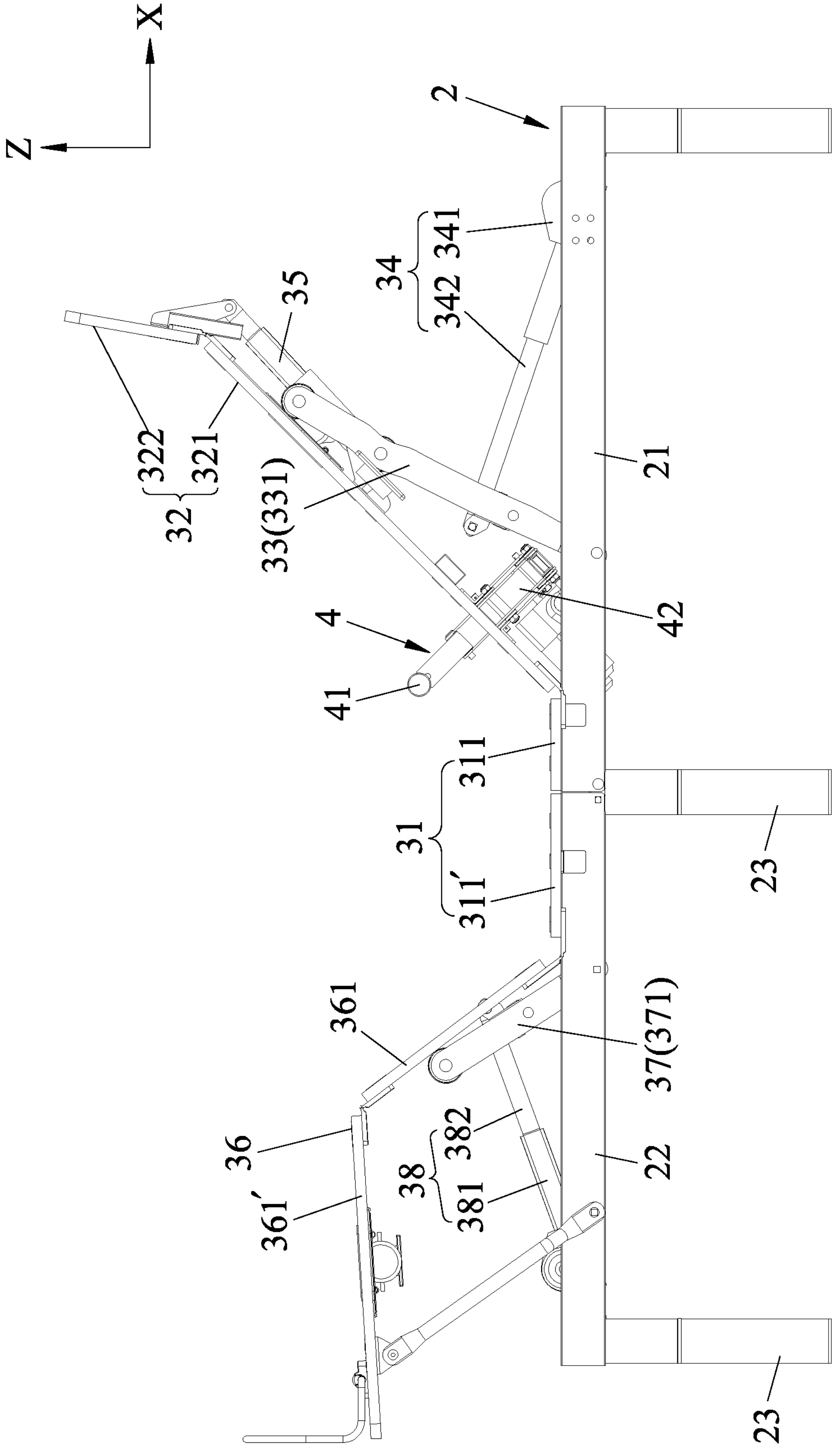
FIG. 7 is a view similar to FIG. 4, but with the first bed board assembly in a reclined state and a second bed board assembly in a leg-raising state.

Referring to FIGS. 6 and 7, in combination with FIG. 3, the bed board unit 3 is disposed on the bed frame 2, and includes a fixed bed board assembly 31, a first bed board assembly 32, a first link rod assembly 33, a first drive member 34, a headboard drive member 35, a second bed board assembly 36, a second link rod assembly 37, and a second drive member 38. For the convenience of illustration and description, a mattress is not shown in the drawings. However, in practical use, it is understandable that the mattress is placed on top of the bed board unit 3.

The fixed bed board assembly 31 is disposed at the center of the bed frame 2, and includes two fixed boards 311, 311' respectively fixed to the inner end rods 212, 222 of the front and rear bed frames 21, 22.

The first bed board assembly 32 is movably disposed on the front bed frame 21, and includes a first bed board 321 pivotally connected to the fixed board 311, and a headrest board 322 pivotally connected to the first bed board 321 on one side thereof which is opposite to the fixed board 311 for supporting the head of a user. The first bed board 321 is configured to support an upper body of the user, and has a through hole 323 that is elongated along a width direction (Y) of the bed frame 2 and that extends through top and bottom sides of the first bed board 321.

The first link rod assembly 33 includes two pivot plates 331 each of which is pivotally connected between one of the side rods 211 of the front bed frame 21 and the first bed board 321, and a first link rod 332 connected between the pivot plates 331.

The first drive member 34 is an electric actuator connected between the outer end rod 213 of the front bed frame 21 and the first link rod 332, and is electrically actuated to drive the first link rod assembly 33 to move the first bed board assembly 32 between a flat horizontal state (see FIG. 4) and a reclined state (see FIG. 7) with respect to the bed frame 2. The headrest board drive member 35 is an electric actuator connected between the first bed board 321 and the headrest board 322 for driving the headrest board 322 to pivot with respect to the first bed board 321 when electrically actuated. Through this, an included angle between the first bed board 321 and the headrest board 322 can be adjusted to meet the user's requirements.

The second bed board assembly 36 is movably disposed on the rear bed frame 22 and is opposite to the first bed board assembly 32 in the length direction (X). The second bed board assembly 36 includes two second bed boards 361, 361' pivotally connected to each other. The second bed board 361 is further pivotally connected to the fixed board 311'. The second bed board 361' is distal from the fixed board 311' in the length direction (X).

The second link rod assembly 37 includes two pivot plates 371 each of which is pivotally connected between one of the side rods 221 of the rear bed frame 22 and the second bed board 361, and a second link rod 372 connected between the pivot plates 371.

The second drive member 38 is an electric actuator connected between the outer end rod 223 of the rear bed frame 22 and the second link rod 372, and is electrically actuated to drive the second link rod assembly 37 to move the second board assembly 36 between a leg-lowering state (see FIG. 4) and a leg-raising state (see FIG. 7) with respect to the bed frame 2.

Moreover, in this embodiment, the first drive member 34 includes a first drive main body 341 connected to the outer end rod 213 of the front bed frame 21, and a first push rod 342 that is telescopically disposed in the first drive main body 341 and that is pivotally connected to the first link rod 332. The second drive member 38 includes a second drive main body 381 connected to the outer end rod 223 of the rear bed frame 22 and opposite to the first drive main body 341, and a second push rod 382 that is telescopically disposed in the second drive main body 381 and that is pivotally connected the second link rod 372. The first push rod 342 and the second push rod 382 are extendable toward each other and toward the middle of the bed frame 2.

Figure 8:
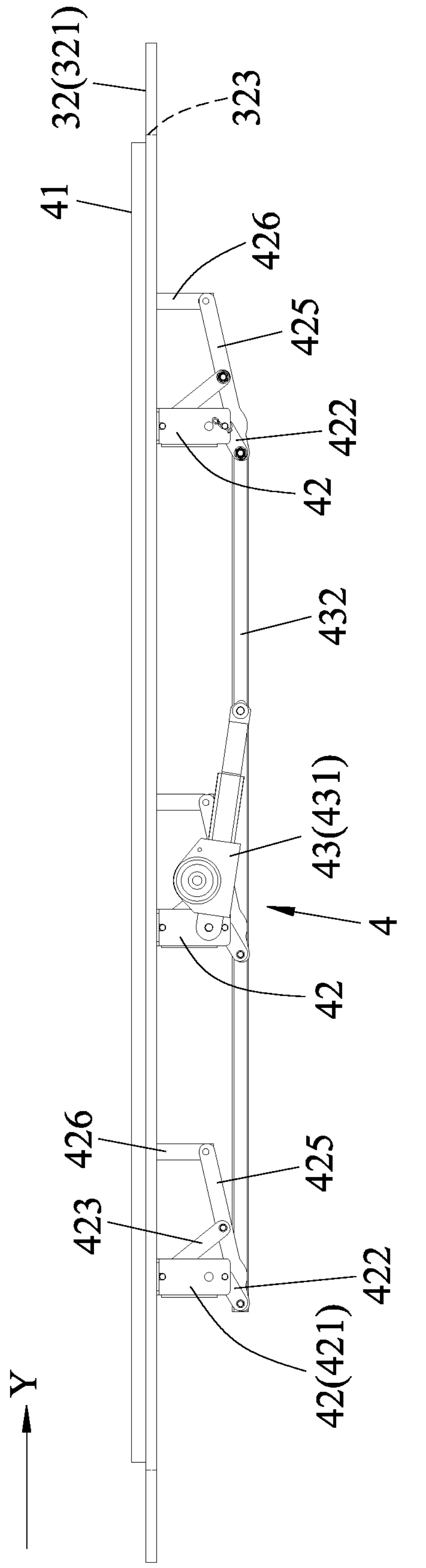
FIG. 8 is a side view of the embodiment, illustrating a lumbar support assembly disposed on a first bed board of the first bed board assembly and a lumbar support member of the lumber support assembly disposed close to the first bed board.
Figure 9:
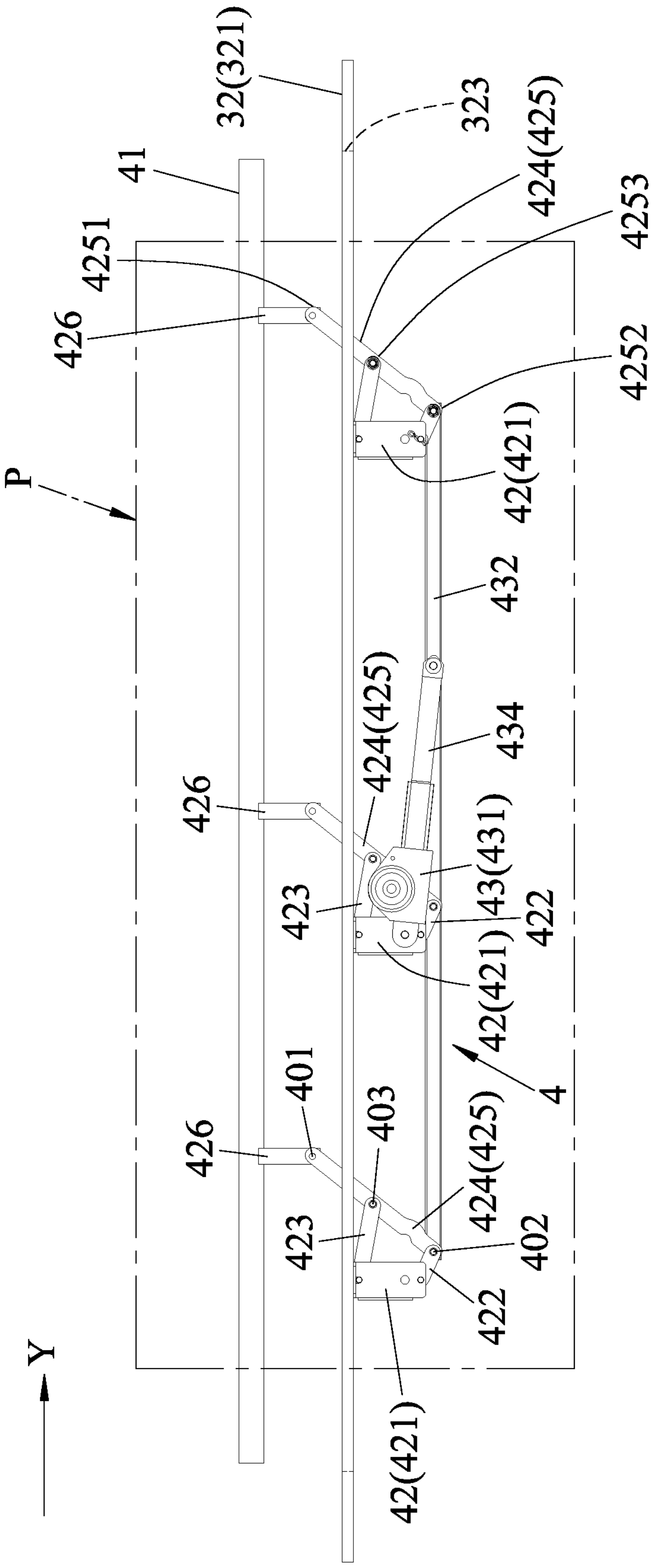
FIG. 9 is a view similar to FIG. 8, but with the lumbar support member extending out of a through hole of the first bed board.
Figure 10:
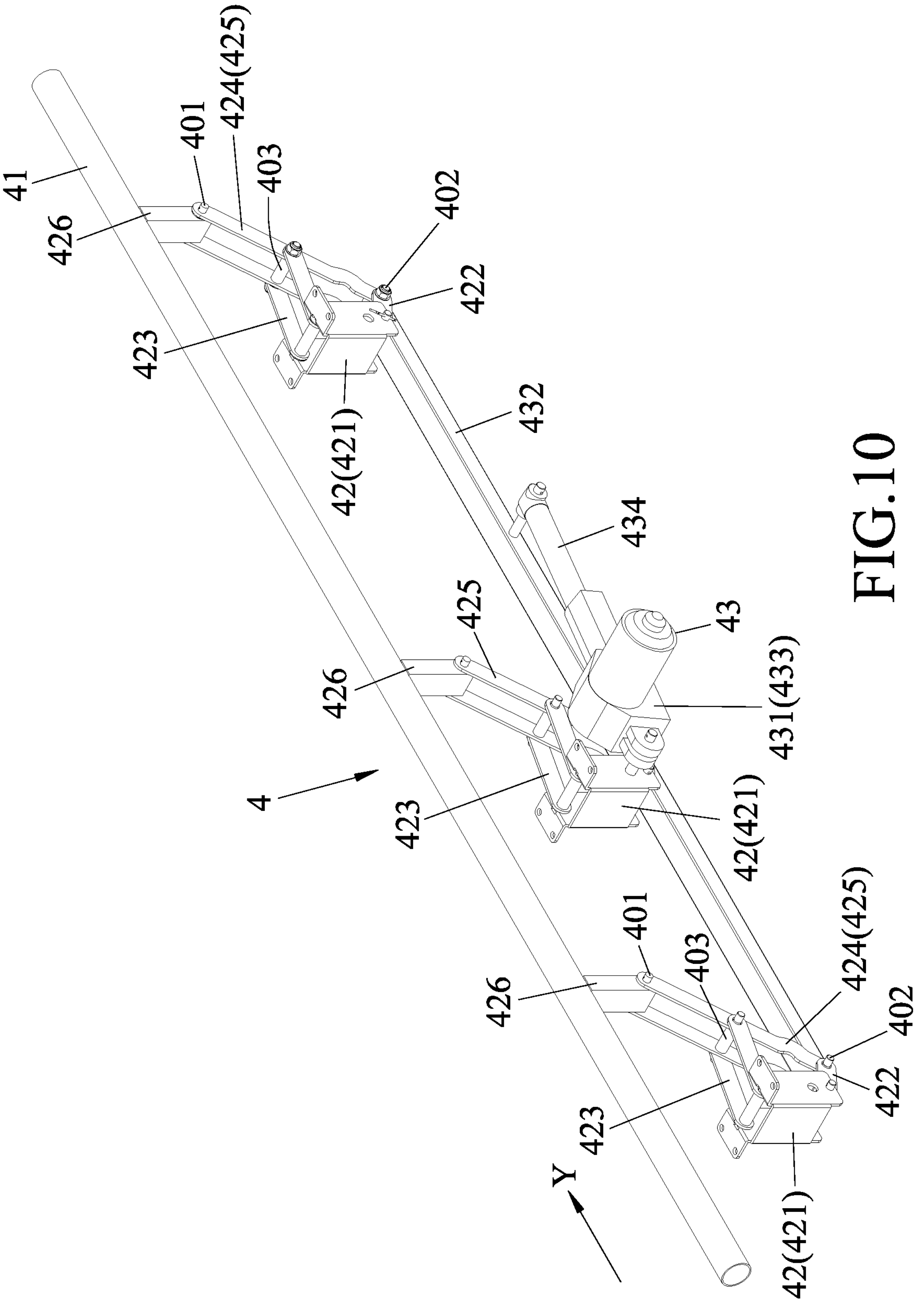
FIG. 10 is a perspective view of the lumbar support assembly of the embodiment.

Referring to FIGS. 8 to 10, in combination with FIG. 6, the lumbar support assembly 4 is movably disposed on the first bed board assembly 32, and includes a lumbar support member 41, three linkage units 42, and a lumbar support drive assembly 43.

The lumbar support member 41 is a long round rod extending along the width direction (Y) and corresponding in position to the through hole 323.

The linkage units 42 are disposed spaced apart from each other on the first bed board 321 in the width direction (Y) for driving movement of the lumbar support member 41. Each linkage unit 42 is a planar four-bar linkage, such as a Chebyshev linkage, and includes a fixing plate assembly 421 fixed to the bottom of the first bed board 321, a drive rod assembly 422 pivotally connected to a lower side of the fixing plate assembly 421, a driven rod assembly 423 pivotally connected to an upper side of the fixing plate assembly 421 and opposite to the drive rod assembly 422, and a float rod assembly 424 pivotally connected to the drive rod assembly 422 and the driven rod assembly 423 and fixedly connected to the lumbar support member 41. The float rod assembly 424 includes a first float rod 425 pivotally connected to the drive rod assembly 422 and the driven rod assembly 423, and a second float rod 426 that is pivotally connected to the first float rod 425, that is spaced apart from the drive rod assembly 422 and the driven rod assembly 423, and that is fixedly connected to the lumbar support member 41. The first float rod 425 has one end 4251 pivotally connected to the second float rod 426 by a first pivot pin 401, another end 4252 that is opposite to the one end 4251 thereof and that is pivotally connected to the drive rod assembly 422 and the horizontal rod 432 by a second pivot pin 402, and an intermediate section 4253 between the one end 4251 and the another end 4252 thereof. The driven rod assembly 423 is pivotally connected to the intermediate section 4253 of the first float rod 425 by a third pivot pin 403.

The lumbar support drive assembly 43 includes a lumbar support drive member 431 and a horizontal rod 432. The horizontal rod 432 extends in the width direction (Y) and is parallel to the lumbar support member 41. The drive rod assemblies 422 and the first float rods 425 of the float rod assemblies 424 of the linkage units 42 are pivotally connected to the horizontal rod 432.

In this embodiment, the lumbar support drive member 431 is an electric actuator including a main body 433 pivotally connected to the fixing plate assembly 421 of a middle one of the linkage units 42, and a telescopic rod 434 disposed in the main body 433 and connected to the horizontal rod 432. The telescopic rod 434 is extendable and retractable in the width direction (Y). The lumbar support drive member 431 is electrically actuated to drive the horizontal rod 432 to move the drive rod assemblies 422 of the linkage units 42 with respect to the first bed board assembly 32 between a first position, in which the lumbar support member 41 is moved toward the through hole 323, and a second position, in which the lumbar support member 41 is moved away from the through hole 323.

Figure 11:
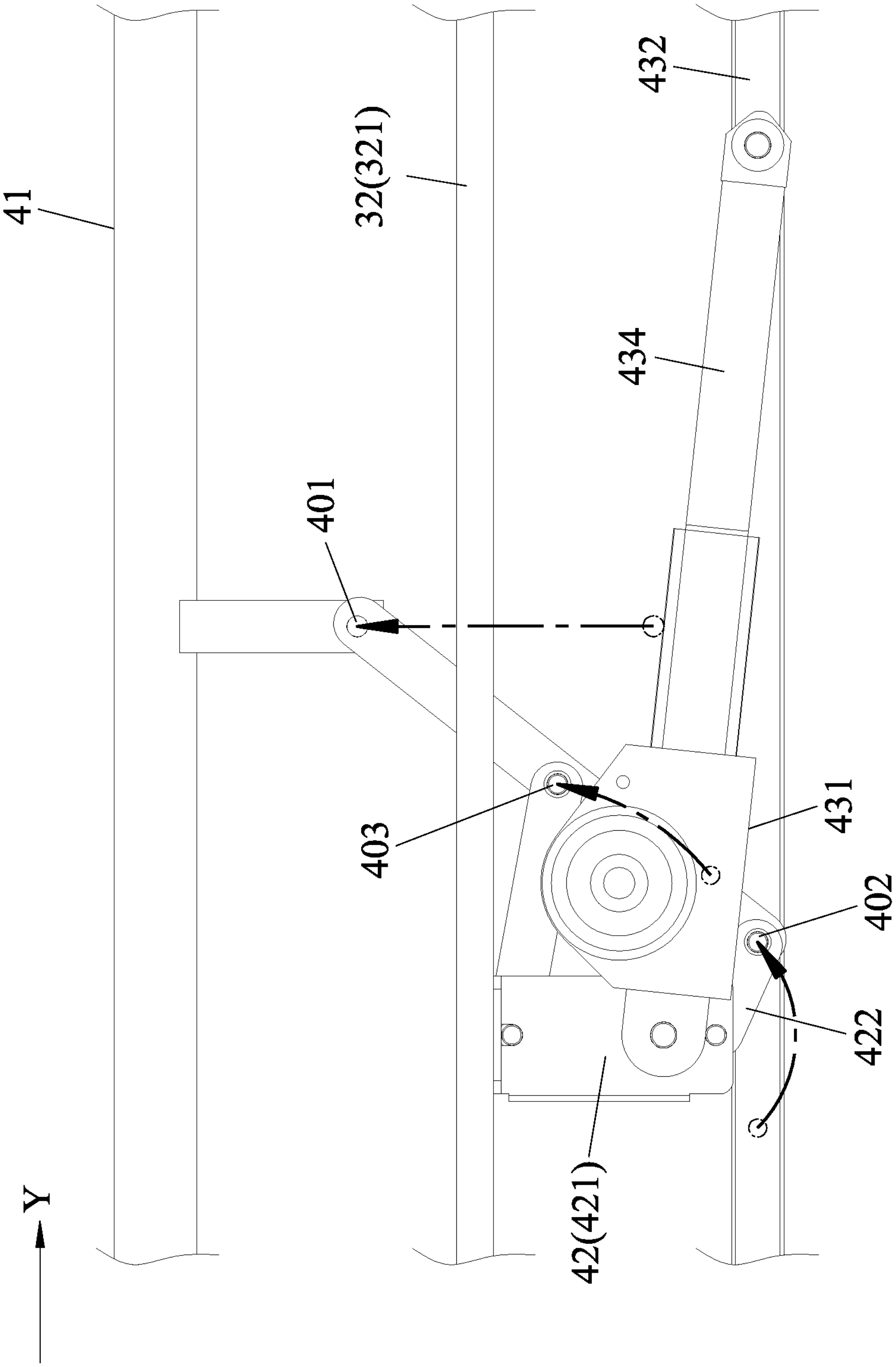
FIG. 11 illustrates how a drive rod assembly of a linkage unit is driven to move by a lumbar support drive member.

Referring to FIG. 11, in combination with FIG. 9, because each linkage unit 42 is a planar four-bar linkage, when the lumbar support drive member 431 drives the horizontal rod 432 to move the drive rod assemblies 422 of the linkage units 42, the lumbar support member 41 is moved relative to the first bed board assembly 32, the linkage units 42 are moved in an imaginary plane (P) that is perpendicular to the through hole 323 and that is parallel to the width direction (Y), and the first pivot pin 401 is moved in a direction perpendicular to the through hole 323, so that the lumbar support member 41 is moved straight up and down in a direction perpendicular to the through hole 323.

It should be understood that the number of the linkage units 42 may be two or more than four, as long as the lumbar support member 41 can be driven to move straight up and down in the direction perpendicular to the through hole 323, any number of the linkage units 42 is acceptable.

In summary, through the design of the linkage units 42 of the electric bed of the present disclosure, the lumbar support member 41 can be moved straight up and down in the direction perpendicular to the through hole 323, so that the lumbar support member 41 will not slide relative to the mattress, and the electric bed of this disclosure is comfortable to use. Further, the lumbar support drive assembly 43 can be independently controlled, so that the user can choose to use or not to use the lumbar support function. In addition, because each linkage unit 42 is designed as a planar four-bar linkage that moves in the imaginary plane (P), a use space in the length direction (X) can be reduced, so that the electric bed of this disclosure can be designed to be foldable to facilitate storage and transport thereof. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electric bed, comprising:

a bed frame;

a bed board unit disposed on said bed frame and including a first bed board assembly movably disposed on one side of said bed frame and having a through hole that is elongated along a width direction of said bed frame, a first drive member disposed on said bed frame, said first drive member being electrically actuated to drive said first bed board assembly to move between a flat horizontal state and a reclined state with respect to said bed frame, and a second bed board assembly disposed on the other side of said bed frame and opposite to said first bed board assembly in a length direction of said bed frame; and a lumbar support assembly movably disposed on said first bed board assembly and including a lumbar support member extending along the width direction and corresponding in position to said through hole, a plurality of linkage units disposed on said first bed board assembly for driving movement of said lumbar support member, each of said linkage units including a fixing plate assembly fixed to said first bed board assembly, a drive rod assembly pivotally connected to one side of said fixing plate assembly, a driven rod assembly pivotally connected to the other side of said fixing plate assembly and opposite to said drive rod assembly, and a float rod assembly pivotally connected to said drive rod assembly and said driven rod assembly and fixedly connected to said lumbar support member, and a lumbar support drive assembly including a horizontal rod, said drive rod assemblies of said linkage units being pivotally connected to said horizontal rod, said lumbar support drive assembly being electrically actuated to drive said horizontal rod to move said drive rod assemblies of said linkage units with respect to said first bed board assembly between a first position, in which said lumbar support member is moved toward said through hole, and a second position, in which said lumbar support member is moved away from said through hole.

2. The electric bed as claimed in claim 1, wherein said float rod assembly includes a first float rod pivotally connected to said drive rod assembly and said driven rod assembly, and a second float rod pivotally connected to said first float rod and fixedly connected to said lumbar support member, said first float rod having one end pivotally connected to said second float rod by a first pivot pin.

3. The electric bed as claimed in claim 2, wherein said lumbar support drive assembly further includes a lumbar support drive member disposed on said fixing plate assembly of one of said linkage units and pivotally connected to said horizontal rod, said first float rods of said float rod assemblies of said linkage units being pivotally connected to said horizontal rod, said horizontal rod extending in the width direction and being parallel to said lumbar support member.

4. The electric bed as claimed in claim 2, wherein said first float rod further has another end that is opposite to said one end thereof and that is pivotally connected to said drive rod assembly and said horizontal rod by a second pivot pin, and an intermediate section between said one end and said another end thereof, said driven rod assembly being pivotally connected to said intermediate section of said first float rod by a third pivot pin.

5. The electric bed as claimed in claim 3, wherein said lumbar support drive member includes a main body disposed on said fixing plate assembly of said one of said linkage units, and a telescopic rod disposed in said main body and connected to said horizontal rod, said telescopic rod being extendable and retractable in the width direction.

6. The electric bed as claimed in claim 1, wherein said lumbar support assembly includes three said linkage units spaced apart from each other in the width direction.

7. The electric bed as claimed in claim 1, wherein each of said linkage units is a planar four-bar linkage.

8. The electric bed as claimed in claim 1, wherein:

said second bed board assembly is movable relative to said bed frame; and said bed board unit further includes a second drive member disposed on said bed frame, said second drive member being electrically actuated to drive said second board assembly to move between a leg-lowering state and a leg-raising state with respect to said bed frame.

9. The electric bed as claimed in claim 8, wherein:

said first drive member includes a first drive main body connected to one side of said bed frame that extends in the width direction, and a first push rod telescopically disposed in said first drive main body;

said second drive member includes a second drive main body disposed on the other side of said bed frame and opposite to said first drive main body, and a second push rod telescopically disposed in said second drive main body; and said first push rod and said second push rod are extendable toward the middle of said bed frame.

10. The electric bed as claimed in claim 1, wherein said first bed board assembly includes a first bed board having said through hole that extends through top and bottom sides thereof, a headrest board pivotally connected to said first bed board, and a headrest board drive member that is electrically actuated to drive said headrest board to pivot with respect to said first bed board.

11. The electric bed as claimed in claim 1, wherein said bed frame includes a front bed frame on which said first bed board assembly is disposed, and a rear bed frame on which said second bed board assembly is disposed, said front bed frame and said rear bed frame being opposite to each other in the length direction of said bed frame and being foldable relative to each other.

* * * * *